No. 739,362. PATENTED SEPT. 22, 1903.
J. TRITSCH.
LINK FOR SHIRT CUFFS OR THE LIKE.
APPLICATION FILED APR. 6, 1903.
NO MODEL.

WITNESSES:
P.W. Wright
E.W. Collins

INVENTOR
JULIUS TRITSCH
BY
Howson and Howson
HIS ATTORNEYS.

No. 739,362. Patented September 22, 1903.

UNITED STATES PATENT OFFICE.

JULIUS TRITSCH, OF VIENNA, AUSTRIA-HUNGARY.

LINK FOR SHIRT-CUFFS OR THE LIKE.

SPECIFICATION forming part of Letters Patent No. 739,362, dated September 22, 1903.

Application filed April 6, 1903. Serial No. 161,295. (No model.)

*To all whom it may concern:*

Be it known that I, JULIUS TRITSCH, a subject of the Emperor of Austria-Hungary, residing at Vienna, in the Empire of Austria-Hungary, have invented certain new and useful Improvements in Links for Shirt-Cuffs or the Like, of which the following is a full, clear, and exact description, such as will enable others skilled in the art to make and use the same.

This invention has for its object a link formed in two pieces for use with shirt-cuffs and the like. This improved link is represented in the accompanying drawings, in which—

Figure 1:
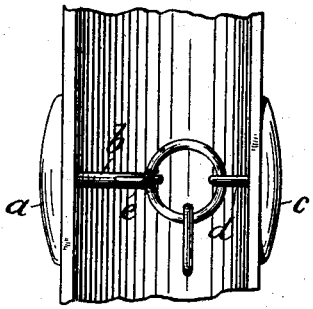
Figure 2:
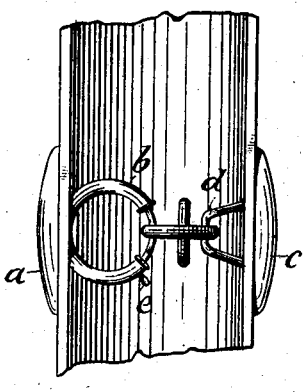

Figure 1 shows the link in side elevation attached to a cuff. Fig. 2 represents it in plan.

One of the plates $a$ of the link is provided upon its rear side with a snap or spring ring $b$, while the other ring carries upon its rear side a fixed eye or preferably a chain $d$, consisting of small links. This is the form of the device which is represented in Figs. 1 and 2.

In order to arrange the link in position, the chain $d$ of the plate $c$ is first of all passed through one of the buttonholes. The spring-ring $b$ of the other plate is then passed through the second buttonhole, whereupon the spring-ring is opened in the known manner by merely pressing upon the small knob $e$, which may be readily effected by one hand by pressing with the forefinger on the knob $e$, while the thumb rests on the plate $a$. The fixed eye or the chain, as the case may be, is then brought near to the spring-ring and passed upon the latter through the opening. The knob $e$ is then released, so that the spring-ring closes and the plates are connected. One hand is all that is necessary for inserting the ring in the fixed eye or in one of the links of the chain by suitably directing the latter and passing it over the eye or link, so that the two plates of the link may be readily connected by any one without having to acquire any particular dexterity. In the same manner the device may be readily released with one hand. To do this it is only necessary to open the spring-ring and withdraw it from the eye or chain-link. The provision of a chain on one of the link-plates presents the advantage that by inserting the ring in one or other of the links of this chain the length of the connection between the plates $a$ and $c$ may be readily regulated—that is to say, shortened or lengthened.

I claim as my invention—

A link cuff-button comprising a plate, a ring rigidly secured thereto, and adapted to be inserted through one buttonhole of the cuff, a spring-closing part to said ring, and a plate having a chain attached adapted to be inserted through the other buttonhole to engage said ring, substantially as described.

In testimony whereof I have signed my name to this specification in the presence of two subscribing witnesses.

JULIUS TRITSCH.

Witnesses:
ALVESTO S. HOGUE,
AUGUST FUGGER.